(12) United States Patent
Goergen et al.

(10) Patent No.: US 10,672,537 B2
(45) Date of Patent: Jun. 2, 2020

(54) INTERFACE MODULE FOR COMBINED DELIVERY POWER, DATA, AND COOLING AT A NETWORK DEVICE

(71) Applicant: CISCO TECHNOLOGY, INC., San Jose, CA (US)

(72) Inventors: Joel Richard Goergen, Soulsbyville, CA (US); Charles Calvin Byers, Wheaton, IL (US); Robert Gregory Twiss, Chapel Hill, NC (US); D. Brice Achkir, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 148 days.

(21) Appl. No.: 15/942,015

(22) Filed: Mar. 30, 2018

(65) Prior Publication Data

US 2019/0304630 A1 Oct. 3, 2019

(51) Int. Cl.
| | | |
|---|---|---|
| G05B 19/00 | (2006.01) | |
| H01B 7/42 | (2006.01) | |
| H01B 9/00 | (2006.01) | |
| H04L 12/10 | (2006.01) | |
| H04L 12/40 | (2006.01) | |
| G02B 6/42 | (2006.01) | |
| G02B 6/44 | (2006.01) | |

(52) U.S. Cl.
CPC .......... *H01B 7/423* (2013.01); *G02B 6/4268* (2013.01); *G02B 6/4416* (2013.01); *H01B 9/003* (2013.01); *H01B 9/005* (2013.01); *H04L 12/10* (2013.01); *H04L 12/40045* (2013.01)

(58) Field of Classification Search
CPC ........ H01B 7/423; H01B 9/005; H01B 9/003; G02B 6/4416; G02B 6/4268; H04L 12/40045; H04L 12/10; H04L 12/40032
See application file for complete search history.

(56) References Cited

U.S. PATENT DOCUMENTS

| | | |
|---|---|---|
| 3,335,324 A | 8/1967 | Buckeridge |
| 4,811,187 A | 3/1989 | Nakajima |
| 5,652,893 A * | 7/1997 | Ben-Meir ............. G06F 1/3215 713/300 |

(Continued)

FOREIGN PATENT DOCUMENTS

| | | |
|---|---|---|
| CN | 201689347 U | 12/2010 |
| CN | 205544597 | 8/2016 |

(Continued)

OTHER PUBLICATIONS https://www.fischerconnectors.com/us/en/products/fiberoptic.
(Continued)

*Primary Examiner* — Michael D Masinick
(74) *Attorney, Agent, or Firm* — Cindy Kaplan

(57) ABSTRACT

In one embodiment, an apparatus includes an interface module for coupling a cable delivering combined power, data, and cooling to a network device. The interface module includes an electrical interface for receiving power for powering the network device, an optical transceiver for receiving optical communications signals, a fluid interface for receiving coolant, and sensors for monitoring the power and cooling and providing information to a central network device delivering the combined power, data, and cooling.

20 Claims, 6 Drawing Sheets

(56) References Cited

U.S. PATENT DOCUMENTS

| | | | |
|---|---|---|---|
| 6,008,631 | A | 12/1999 | Johari |
| 6,220,955 | B1* | 4/2001 | Posa ............... F21V 29/56 454/184 |
| 6,259,745 | B1 | 7/2001 | Chan |
| 6,636,538 | B1 | 10/2003 | Stephens |
| 6,685,364 | B1 | 2/2004 | Brezina |
| 6,826,368 | B1 | 11/2004 | Koren |
| 6,855,881 | B2* | 2/2005 | Khoshnood ......... G02B 6/3817 174/15.1 |
| 6,860,004 | B2 | 3/2005 | Hirano |
| 7,325,150 | B2 | 1/2008 | Lehr |
| 7,490,996 | B2* | 2/2009 | Sommer ............. G02B 6/3817 385/75 |
| 7,492,059 | B2 | 2/2009 | Peker |
| 7,509,505 | B2 | 3/2009 | Randall |
| 7,583,703 | B2 | 9/2009 | Bowser |
| 7,589,435 | B2 | 9/2009 | Metsker |
| 7,593,747 | B1 | 9/2009 | Karam |
| 7,603,570 | B2 | 10/2009 | Schindler |
| 7,616,465 | B1 | 11/2009 | Vinciarelli |
| 7,813,646 | B2 | 10/2010 | Furey |
| 7,835,389 | B2 | 11/2010 | Yu |
| 7,854,634 | B2 | 12/2010 | Filipon |
| 7,881,072 | B2 | 2/2011 | DiBene |
| 7,915,761 | B1 | 3/2011 | Jones |
| 7,921,307 | B2 | 4/2011 | Karam |
| 7,924,579 | B2 | 4/2011 | Arduini |
| 7,940,787 | B2 | 5/2011 | Karam |
| 7,973,538 | B2 | 7/2011 | Karam |
| 8,020,043 | B2 | 9/2011 | Karam |
| 8,037,324 | B2 | 10/2011 | Hussain |
| 8,081,589 | B1 | 12/2011 | Gilbrech |
| 8,184,525 | B2 | 5/2012 | Karam |
| 8,276,397 | B1 | 10/2012 | Carlson et al. |
| 8,279,883 | B2 | 10/2012 | Diab |
| 8,319,627 | B2 | 11/2012 | Chan |
| 8,345,439 | B1 | 1/2013 | Goergen |
| 8,350,538 | B2 | 1/2013 | Cuk |
| 8,358,893 | B1 | 1/2013 | Sanderson |
| 8,700,923 | B2 | 4/2014 | Fung |
| 8,712,324 | B2* | 4/2014 | Corbridge ............. G06F 1/1632 455/41.1 |
| 8,750,710 | B1* | 6/2014 | Hirt .................. H04B 10/25759 398/135 |
| 8,781,637 | B2 | 7/2014 | Eaves |
| 8,787,775 | B2* | 7/2014 | Earnshaw ............ H04B 10/506 398/202 |
| 8,829,917 | B1 | 9/2014 | Lo et al. |
| 8,836,228 | B2 | 9/2014 | Xu |
| 8,842,430 | B2 | 9/2014 | Hellriegel et al. |
| 8,849,471 | B2 | 9/2014 | Daniel |
| 8,966,747 | B2 | 3/2015 | Vinciarelli |
| 9,019,895 | B2 | 4/2015 | Li |
| 9,024,473 | B2 | 5/2015 | Huff |
| 9,184,795 | B2 | 11/2015 | Eaves |
| 9,189,036 | B2 | 11/2015 | Ghoshal |
| 9,189,043 | B2 | 11/2015 | Vorenkamp |
| 9,273,906 | B2 | 3/2016 | Goth et al. |
| 9,319,101 | B2 | 4/2016 | Lontka |
| 9,321,362 | B2* | 4/2016 | Woo .................. B60L 11/1818 |
| 9,373,963 | B2 | 6/2016 | Kuznelsov |
| 9,419,436 | B2 | 8/2016 | Eaves |
| 9,510,479 | B2 | 11/2016 | Vos |
| 9,590,811 | B2 | 3/2017 | Hunter, Jr. |
| 9,618,714 | B2* | 4/2017 | Murray ................ G02B 6/3817 |
| 9,640,998 | B2 | 5/2017 | Dawson et al. |
| 9,665,148 | B2 | 5/2017 | Hamdi |
| 9,693,244 | B2 | 6/2017 | Maruhashi et al. |
| 9,734,940 | B1 | 8/2017 | McNutt |
| 9,853,689 | B2 | 12/2017 | Eaves |
| 9,874,930 | B2 | 1/2018 | Vavilala |
| 9,882,656 | B2 | 1/2018 | Sipes et al. |
| 9,893,521 | B2 | 2/2018 | Lowe |
| 9,948,198 | B2 | 4/2018 | Imai |
| 9,979,370 | B2 | 5/2018 | Xu |
| 9,985,600 | B2 | 5/2018 | Xu |
| 10,007,628 | B2 | 6/2018 | Pitigoi-Aron |
| 10,028,417 | B2 | 7/2018 | Schmidtke |
| 10,128,764 | B1 | 11/2018 | Vinciarelli |
| 10,248,178 | B2 | 4/2019 | Brooks |
| 10,439,432 | B2 | 10/2019 | Eckhardt |
| 2001/0024373 | A1 | 9/2001 | Cuk |
| 2002/0126967 | A1 | 9/2002 | Panak |
| 2004/0000816 | A1 | 1/2004 | Khoshnood |
| 2004/0033076 | A1 | 2/2004 | Song |
| 2004/0043651 | A1 | 3/2004 | Bain |
| 2004/0073703 | A1 | 4/2004 | Boucher |
| 2005/0197018 | A1 | 9/2005 | Lord |
| 2005/0268120 | A1 | 12/2005 | Schindler |
| 2006/0202109 | A1 | 9/2006 | Delcher |
| 2006/0209875 | A1 | 9/2006 | Lum |
| 2007/0103168 | A1 | 5/2007 | Batten |
| 2007/0236853 | A1 | 10/2007 | Crawley |
| 2007/0263675 | A1 | 11/2007 | Lum |
| 2007/0284946 | A1 | 12/2007 | Robbins |
| 2007/0288125 | A1 | 12/2007 | Quaratiello |
| 2008/0229120 | A1 | 9/2008 | Diab |
| 2008/0310067 | A1 | 12/2008 | Diab |
| 2010/0077239 | A1 | 3/2010 | Diab |
| 2010/0117808 | A1 | 5/2010 | Karam |
| 2010/0171602 | A1 | 7/2010 | Kabbara |
| 2010/0190384 | A1 | 7/2010 | Lanni |
| 2010/0237846 | A1 | 9/2010 | Vetteth |
| 2010/0290190 | A1 | 11/2010 | Chester |
| 2011/0290497 | A1 | 1/2011 | Stenevik |
| 2011/0083824 | A1 | 4/2011 | Rogers |
| 2011/0228578 | A1 | 9/2011 | Serpa |
| 2011/0266867 | A1 | 11/2011 | Schindler |
| 2012/0064745 | A1 | 3/2012 | Ottliczky |
| 2012/0170927 | A1 | 7/2012 | Huang |
| 2012/0201089 | A1 | 8/2012 | Barth et al. |
| 2012/0231654 | A1 | 9/2012 | Conrad |
| 2012/0317426 | A1 | 12/2012 | Hunter, Jr. |
| 2012/0319468 | A1 | 12/2012 | Schneider |
| 2013/0077923 | A1 | 3/2013 | Peeters Weem et al. |
| 2013/0079633 | A1 | 3/2013 | Peeters Weem |
| 2013/0103220 | A1 | 4/2013 | Eaves |
| 2013/0249292 | A1 | 9/2013 | Blackwell, Jr. |
| 2013/0272721 | A1 | 10/2013 | van Veen |
| 2014/0111180 | A1 | 4/2014 | Vladan |
| 2014/0129850 | A1 | 5/2014 | Paul |
| 2014/0258742 | A1 | 9/2014 | Chien |
| 2014/0265550 | A1 | 9/2014 | Milligan |
| 2014/0372773 | A1 | 12/2014 | Heath |
| 2015/0078740 | A1 | 3/2015 | Sipes, Jr. |
| 2015/0106539 | A1 | 4/2015 | Leinonen |
| 2015/0115741 | A1 | 4/2015 | Dawson |
| 2015/0215001 | A1 | 7/2015 | Eaves |
| 2015/0215131 | A1 | 7/2015 | Paul |
| 2015/0333918 | A1 | 11/2015 | White, III |
| 2016/0020911 | A1 | 1/2016 | Sipes, Jr. |
| 2016/0064938 | A1 | 3/2016 | Balasubramanian |
| 2016/0111877 | A1 | 4/2016 | Eaves |
| 2016/0118784 | A1 | 4/2016 | Saxena |
| 2016/0133355 | A1 | 5/2016 | Glew |
| 2016/0134331 | A1 | 5/2016 | Eaves |
| 2016/0142217 | A1 | 5/2016 | Gardner et al. |
| 2016/0197600 | A1 | 7/2016 | Kuznetsov |
| 2016/0365967 | A1 | 7/2016 | Tu |
| 2016/0241148 | A1 | 8/2016 | Kizilyalli |
| 2016/0262288 | A1 | 9/2016 | Chainer et al. |
| 2016/0273722 | A1 | 9/2016 | Crenshaw |
| 2016/0294500 | A1 | 10/2016 | Chawgo |
| 2016/0308683 | A1 | 10/2016 | Pischl |
| 2016/0352535 | A1 | 12/2016 | Hiscock |
| 2017/0041152 | A1 | 2/2017 | Sheffield |
| 2017/0041153 | A1 | 2/2017 | Picard |
| 2017/0054296 | A1 | 2/2017 | Daniel |
| 2017/0110871 | A1 | 4/2017 | Foster |
| 2017/0123466 | A1 | 5/2017 | Carnevale |
| 2017/0146260 | A1 | 5/2017 | Ribbich |
| 2017/0155517 | A1 | 6/2017 | Cao |
| 2017/0164525 | A1 | 6/2017 | Chapel |

(56) References Cited

U.S. PATENT DOCUMENTS

| | | |
|---|---|---|
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0248976 A1 | 8/2017 | Moller |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2019/0267804 A1 | 8/2019 | Matan |
| 2019/0280895 A1 | 9/2019 | Mather |

FOREIGN PATENT DOCUMENTS

| | | |
|---|---|---|
| EP | 1936861 A1 | 6/2008 |
| EP | 2120443 A1 | 11/2009 |
| EP | 2693688 A1 | 2/2014 |
| WO | WO199316407 A1 | 8/1993 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |

OTHER PUBLICATIONS http://www.strantech.com/products/tfoca-genx-hybrid-2×2-fiber-optic-copper-connector/.
http://www.qpcfiber.com/product/connectors/e-link-hybrid-connector/.
https://www.lumentum.com/sites/default/files/technical-library-items/powerovertiber-tn-pv-ae_0.pdf.
"Network Remote Power Using Packet Energy Transfer", Eaves et al., www.voltserver.com, Sep. 2012.
Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.
Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.
Yencheck, Thermal Modeling of Portable Power Cables, 1993.
Zhang, Machine Learning-Based Temperature Prediction for Runtime Thermal Management across System Components, Mar. 2016.
Data Center Power Equipment Thermal Guidelines and Best Practices.
Dynamic Thermal Rating of Substation Terminal Equipment by Rambabu Adapa, 2004.
Chen, Real-Time Termperature Estimation for Power MOSEFETs Conidering Thermal Aging Effects:, IEEE Trnasactions on Device and Materials Reliability, vol. 14, No. 1, Mar. 2014.

* cited by examiner

INTERFACE MODULE FOR COMBINED DELIVERY POWER, DATA, AND COOLING AT A NETWORK DEVICE

TECHNICAL FIELD

The present disclosure relates generally to communications networks, and more particularly, to an interface module for transmitting and receiving power, data, and cooling in a communications network.

BACKGROUND

Network devices such as computer peripherals, network access points, and IoT (Internet of Things) devices may have both their data connectivity and power needs met over a single combined function cable such as PoE (Power over Ethernet). In conventional PoE systems, power is delivered over the cables used by the data over a range from a few meters to about one hundred meters. When a greater distance is needed or fiber optic cables are used, power is typically supplied through a local power source such as a nearby wall outlet due to limitations with capacity, reach, and cable loss in conventional PoE. Today's PoE systems also have limited power capacity, which may be inadequate for many classes of devices. If the available power over combined function cables is increased, cooling may also need to be delivered to the high powered remote devices.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
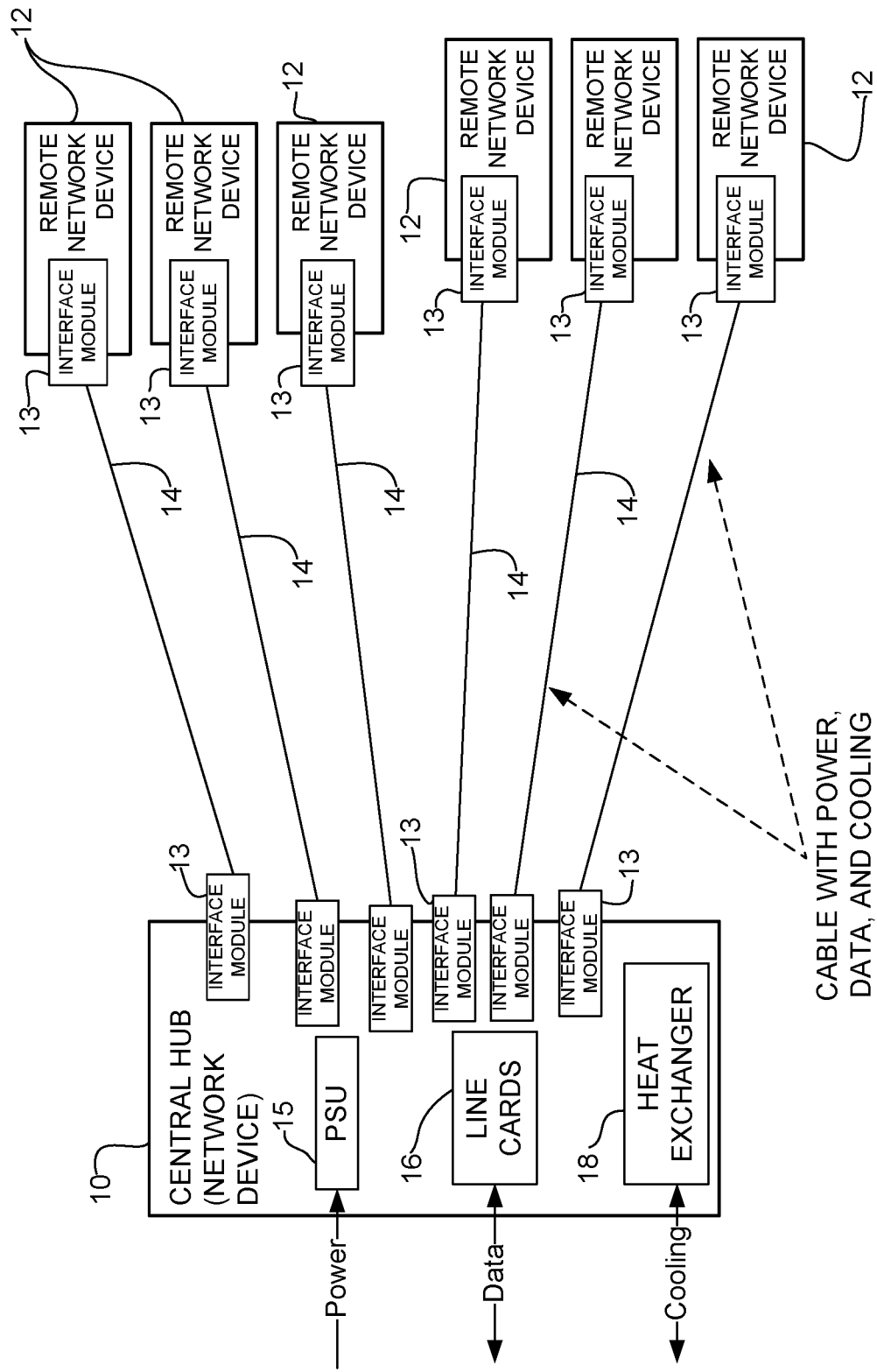
FIG. 1 illustrates an example of a network in which embodiments described herein may be implemented.

In one embodiment, an apparatus generally comprises an interface module for coupling a cable delivering combined power, data, and cooling to a network device, the interface module comprising an electrical interface for receiving power for powering the network device, an optical transceiver for receiving optical communications signals, a fluid interface for receiving coolant, and sensors for monitoring the power and cooling and providing information to a central network device delivering the combined power, data, and cooling.

In another embodiment, an apparatus generally comprises an interface module for coupling a cable delivering combined power, data, and cooling to power sourcing equipment, the interface module comprising an electrical interface for delivering power for powering a remote network device, an optical interface for delivering optical communications signals to the remote network device, a fluid interface for delivering coolant to the remote network device, and a control system for receiving power and cooling information from the remote network device and controlling delivery of the power and cooling.

In another embodiment, an interface module generally comprises a first interface for coupling with a cable connector of a cable comprising an electrical wire for carrying power, an optical fiber for carrying data, and a cooling tube for carrying coolant, a second interface for coupling with a network device, power contacts for transferring power between the cable and the network device at the first interface, a cooling path for cooling components in the interface module, and sensors for monitoring power and cooling at the interface module. Monitoring information is provided to a control system for controlling power, data, and cooling at the interface module when coupled to the cable and the network device.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. These systems are limited in range to a few meters to about 100 meters. The maximum power delivery capacity of standard PoE is approximately 100 Watts, but many classes of powered devices would benefit from power delivery of 1000 Watts or more. In conventional systems, when a larger distance is needed, fiber optic cabling is used to deliver data and when larger power delivery ratings are needed, power is supplied to a remote device through a local power source.

As previously noted, it is desirable to increase the power available over multi-function cables to hundreds and even thousands of watts. This capability may enable many new choices in network deployments where major devices such as workgroup routers, multi-socket servers, large displays, wireless access points, fog nodes, or other devices are operated over multi-function cables. This capability would greatly decrease installation complexity and improve the total cost of ownership of a much wider set of devices that have their power and data connectivity needs met from a central hub.

Beyond the data and power supply capabilities noted above, there is also a need for cooling. For high-powered devices, especially those with high thermal density packaging or total dissipation over a few hundred Watts, traditional convection cooling methods may be inadequate. This is particularly apparent where special cooling challenges are present, such as with a device that is sealed and cannot rely on drawing outside air (e.g., all-season outdoor packaging), a hermetically sealed device (e.g., used in food processing or explosive environments), or where fan noise is a problem (e.g., office or residential environments), or any combination of the above along with extreme ambient temperature environments. In these situations, complex and expensive specialized air cooling systems are often used.

In order to overcome the above issues, PoE may be augmented to allow it to carry higher data rates, higher power delivery, and integrated thermal management cooling combined into a single cable, as described, for example, in U.S. patent application Ser. No. 15/910,203 ("Combined Power, Data, and Cooling Delivery in a Communications Network"), filed Mar. 2, 2018, which is incorporated herein by reference in its entirety. These connections may be point-to-point, such as from a central hub to one or more remote devices (e.g., full hub and spoke layout). In another example, a single combined function cable may be run most of the way to a cluster of powered devices and then split, as described, for example, in U.S. patent application Ser. No. 15/918,972 ("Splitting of Combined Delivery Power, Data, and Cooling in a Communications Network"), filed Mar. 12, 2018, which is incorporated herein by reference in its entirety.

In addition to the cables to deliver the power, data, and cooling, and control systems operable to control delivery of the power, data, and cooling, what is needed is an interface module at the network device to deliver the combined power, data, and cooling from the PSE (Power Sourcing Equipment) and receive the power, data, and cooling at the PD (Powered Device).

The embodiments described herein provide an interface module incorporating wires for power, optical fibers for data, and coolant paths (pipes, tubes) for cooling, for use in delivery of power, data, and cooling from a PSE (Power Sourcing Equipment) or receiving power, data, and cooling at a PD (Powered Device). In one or more embodiments, an optical transceiver module may be configured to deliver (or receive) power and cooling along with the optical data. The interface module may include one or more sensors, monitors, valves, or controllers for use in monitoring and controlling the power, data, and cooling.

Referring now to the drawings, and first to FIG. 1, an example of a network in which embodiments described herein may be implemented is shown. For simplification, only a small number of nodes are shown. The embodiments operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, IoT network, optical network, Internet, intranet, or any other network).

The network is configured to provide power (e.g., power greater than 100 Watts), data (e.g., optical data), and cooling (liquid, gas, or multi-phase coolant) from a central network device 10 to a plurality of remote network devices 12 (e.g., switches, routers, servers, access points, computer peripherals, IoT devices, fog nodes, or other electronic components and devices). Signals may be exchanged among communications equipment and power transmitted from power sourcing equipment (PSE) (e.g., central hub 10) to powered devices (PDs) (e.g., remote communications devices 12).

In one or more embodiments, a system, referred to herein as a PoE (Power over Ethernet)+Fiber+Cooling (PoE+F+C) system, provides high power energy delivery, fiber delivered data, and cooling within a single cable. As described in detail below, the PoE+F+C system delivers combined power, data, and cooling to a network (e.g., switch/router system) configured to receive power, data, and cooling over a cabling system comprising optical fibers, electrical wires (e.g., copper wires), and coolant tubes connected to the network devices 10, 12 through an interface module 13. The PoE+F+C system may include a control system that receives input from sensors located throughout the system for detecting and managing faults or dangerous conditions and controlling delivery of power, data, and cooling.

The PoE+F+C system (power, data, and cooling system) allows high power devices to be located in remote locations, extreme temperature environments, or noise sensitive environments, with their cooling requirements met through the same cable that carries data and power. The use of a single cable for all interconnect features needed by a remote device greatly simplifies installation and ongoing operation of the network and network devices.

The network may include any number or arrangement of network devices (e.g., switches, access points, routers, or other devices operable to route (switch, forward) data communications). The remote devices 12 may be located at distances greater than 100 meters (e.g., 1 km, 10 km, or any other distance) from the central hub 10, and/or operate at greater power levels than 100 Watts (e.g., 250 Watts, 1000 Watts, or any other power level). The remote devices 12 may also be in communication with one or more other devices (e.g., fog node, IoT device, sensor, and the like). In one or more embodiments, a redundant central hub (not shown) may provide backup or additional power, bandwidth, or cooling, as needed in the network. In this case, the remote network device 12 would include another interface module 13 for connection with another cable 14 delivering power, data, and cooling from the redundant central hub.

As previously noted, the network may also include one or more splitting devices (not shown) to allow the network to go beyond point-to-point topologies and build passive stars, busses, tapers, multi-layer trees, etc. In this case, a single long PoE+F+C cable would run to a conveniently located intermediary splitter device (e.g., passive splitter) servicing a cluster of physically close endpoint devices (remote network devices, remote communications devices). One or more control systems for the power, data, and cooling may interact between the central hub 10 and the remote devices 12, and their interface modules 13 to ensure that each device receives its fair share of each resource.

In the example shown in FIG. 1, the central hub 10 comprises a power supply unit (PSU) 15 for receiving and distributing power (e.g., building power from a power grid, renewable energy source, generator, or battery), a network interface (e.g., fabric, line cards) 16 for receiving data from or transmitting data to a network (e.g., Internet), and a heat exchanger 18 in fluid communication with a cooling plant (or other cooling source). The interface modules 13 on central hub 10 receive power from the PSU 15, receive data from and transmit data to the line cards 16, and receive supply coolant from and deliver return coolant to the heat exchanger 18. For simplification, electrical, data, and cooling paths between the interface modules 13 and the PSU 15, line cards 16, and heat exchanger 18 are not shown at the central hub in FIG. 1.

The central hub 10 may be operable to provide high capacity power from an internal power system (e.g., PSU 15 capable of delivering power over and including 5 kW, 100 kW, etc., and driving the plurality of devices 12, each in the 100-3000 W range). The PSU 15 may provide, for example, PoE, pulsed power, DC power, or AC power. The central hub 10 (PSE (Power Sourcing Equipment)) is operable to receive power external from a communications network and transmit the power, along with data and cooling to the remote network devices (PDs (Powered Devices)) 12. The central hub 10 may comprise, for example, a router, convergence device, access device, or any other suitable network device operable to deliver power, data, and cooling. As described in detail below, the central hub 10 provides control logic for the cooling loop, as well as the power and data transport functions of the combined cable 14. Additional components and functions of the central hub 10 are described below with respect to FIG. 2.

Cables 14 extending from the central hub 10 to the remote network devices 12 are configured to transmit power, data, and cooling in a single cable (combined cable, multi-function cable, multi-use cable, hybrid cable). The cables 14 may be formed from any material suitable to carry electrical power, data (e.g., copper, fiber), and coolant (liquid, gas, or multi-phase) and may carry any number of electrical wires, optical fibers, and cooling tubes in any arrangement.

The interface module 13 (also referred to herein as an optical transceiver, optical module, data/power/cooling interface module, or PoE+F+C interface module) couples the network devices 10, 12 to the cables 14 for delivery of the combined power, data, and cooling. In one or more embodiments, the interface module 13 comprises an optical transceiver modified to incorporate power and coolant components to deliver power and cooling through the optical transceiver. For example, the interface module 13 may comprise an optical transceiver modified along with a connector system to incorporate electrical (copper) wires to deliver power through the optical transceiver and coolant lines to deliver cooling from the central hub 10 to the remote network devices 12 for use by the remote network devices. The interface module 13 allows power to be delivered to the remote network devices 12 in locations where standard power is not available and provides cooling for use in cooling higher power devices (e.g., greater than 100 W). As described below, the interface module 13 may be configured to tap some of the energy and make intelligent decisions so that the power source 10 knows when it is safe to increase power on the wires without damaging the system or endangering an operator. Details of the interface module 13 in accordance with one embodiment are described below with respect to FIG. 6.

Internet of Things (IoT) applications such as remote sensors/actuators and fog computing may also take advantage of the greater reach and power delivery capacity of this system. For example, one or more of the network devices 12 may deliver power using PoE or USB to electronic components such as IP (Internet Protocol) cameras, VoIP (Voice over IP) phones, video cameras, point-of-sale devices, security access control devices, residential devices, building automation devices, industrial automation, factory equipment, lights (building lights, streetlights), traffic signals, and many other electrical components and devices. With an extended reach (e.g., one to ten km), all power to communications equipment throughout a building or across a neighborhood may be delivered from one source, along with the communications link for the equipment, thereby providing a user with complete control of the location of communications equipment without the 100 m limitation of traditional PoE.

In one embodiment, one or more of the network devices 12 may comprise dual-role power ports that may be selectively configurable to operate as a PSE (Power Source Equipment) port to provide power to a connected device or as a PD (Powered Device) port to sink power from the connected device, and enable the reversal of energy flow under system control, as described in U.S. Pat. No. 9,531, 551 ("Dynamically Configurable Power-Over-Ethernet Apparatus and Method", issued Dec. 27, 2016), for example. The dual-role power ports may be PoE or PoE+F ports, enabling them to negotiate their selection of either PoE or higher power PoE+F in order to match the configuration of the ports on line cards 16 with the corresponding ports on each remote network device 12, for example.

In one or more embodiments, there is no need for additional electrical wiring for the communications network and all of the network devices operate using the power provided by the PoE+F+C system. In other embodiments, in addition to the remote communications devices 12 configured to receive power, data, and cooling from the central hub 10, the network may also include one or more network devices comprising conventional network devices that only process and transmit data. These network devices receive electrical power from a local power source such as a wall outlet. Similarly, one or more of the network devices may eliminate the data interface, and only interconnect power (e.g., moving data interconnection to wireless networks). Also, one or more devices may be configured to receive only power and data, or only power and cooling, for example.

It is to be understood that the network devices and topology shown in FIG. 1 and described above is only an example and the embodiments described herein may be implemented in networks comprising different network topologies or a different number, type, or arrangement of network devices, without departing from the scope of the embodiments. For example, the network may comprise any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. For example, the PoE+F+C system may be used in a fog node deployment in which computation, networking, and storage are moved from the cloud to locations much closer to IoT sensors and actuators. The fog nodes may provide power to PoE devices such as streetlights, traffic signals, 5G cells, access points, base stations, video cameras, or any other electronic device serving a smart building, smart city, or any other deployment.

Figure 2:
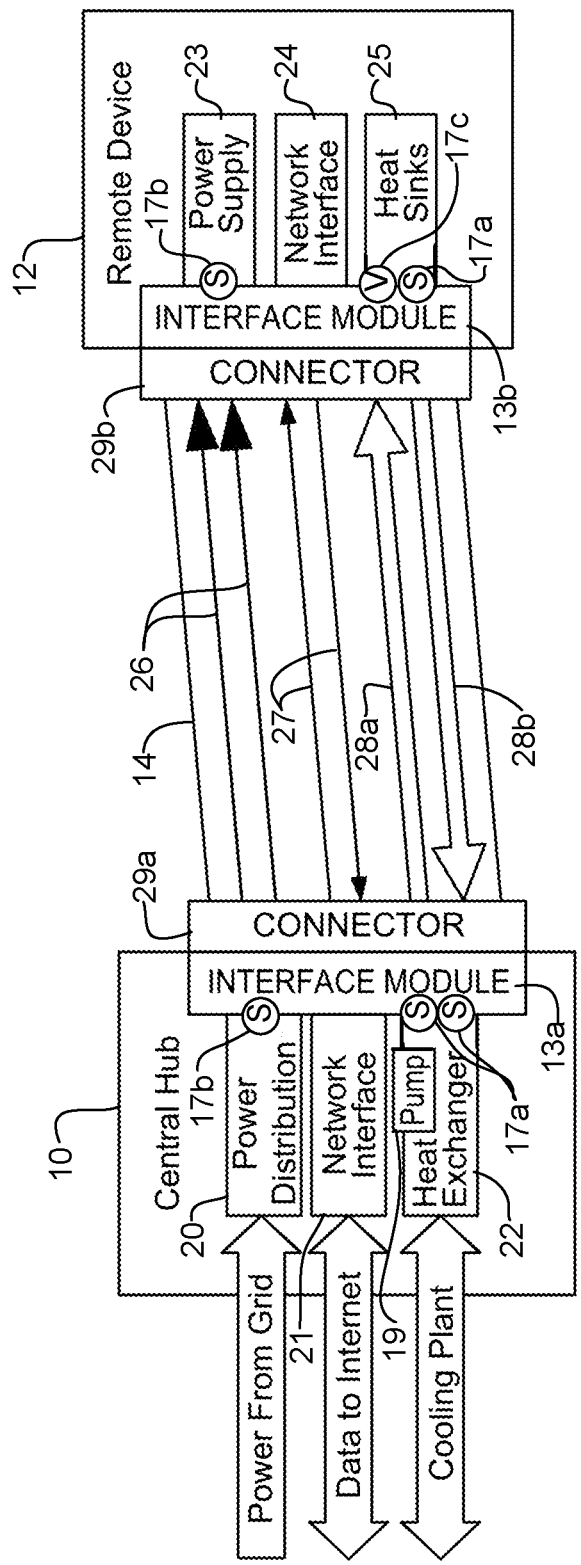
FIG. 2 illustrates an example of power, data, and cooling delivery from a central hub to a remote device in the network of FIG. 1.

FIG. 2 schematically illustrates the cable 14 transmitting power, data, and cooling from the central hub 10 to one of the remote devices 12, in accordance with one embodiment. In this example, the central hub (PSE) 10 and remote network device (PD) 12 each comprises an interface module 13a, 13b, respectively, for coupling with the cable 14 delivering power, data, and cooling. As previously noted above with respect to FIG. 1, the central hub 10 may comprise any number of interface modules for communication with any number of network devices 12. Also, the remote device 12 may comprise more than one interface module for communication with a redundant central hub, for example.

As described in detail below, the interface module 13a, 13b comprises an electrical interface for delivering or receiving power for powering the network device 12, an optical transceiver for transmitting or receiving data comprising optical communications signals, and a fluid interface for delivering or receiving cooling. The interface module 13a, 13b may include one or more sensors 17a, 17b for monitoring power and cooling and providing monitoring information to a control system operable to control delivery of the power, data, and cooling in the PoE+F+C system. In the example shown in FIG. 2, sensors 17a monitor aggregate and individual branch coolant temperatures, pressures, and flow rate quantities at strategic points around the cooling loop (cooling path) and sensors 17b monitor current and voltage of the power delivery system at either end of power conductors 26. One or more valves 17c may be used to control the amount of cooling delivered to the remote device 12 based upon its instantaneous needs, as described below.

The central hub 10 includes a power distribution module 20 for receiving power from a power grid, network interface 21 for receiving data from and transmitting data to a network (e.g., Internet), and a heat exchanger 22 for fluid communication with a cooling plant. The power distribution module 20 provides power to a power supply module 23 at the remote device 12. The network interface 21 at the central hub 10 is in communication with network interface 24 at the remote device 12. The heat exchanger 22 at the central hub 10 forms a cooling loop with one or more heat sinks 25 at the remote device 12. The central hub 10 may provide control logic for the cooling loop, as well as the power and data transport functions of the combined cable 14, as described below. One or more of the components shown at the central hub 10 and remote device 12 (e.g., sensors 17a, 17b, valve 17c, network interface 24, heat sink 25) may be located within the interface module, as described below with respect to FIG. 6

In the example shown in FIG. 2, the cable 14 includes two power lines (conductors) 26, two data lines (optical fibers) 27, and two coolant tubes (supply 28a and return 28b) coupled to connectors 29a and 29b, which are connected to the interface modules 13a, 13b located at the central hub 10 and remote device 12. The closed coolant loop is established through the two coolant tubes 28a, 28b that share the same combined cable jacket with the fibers 27 that provide data connectivity to the network and conductors 26 that provide power from the power grid. It is to be understood that that this is only an example and that the cable 14 may contain any number of power, data, or cooling lines. For example, instead of using two optical fiber paths 27 to transfer data from the central hub 10 to the remote device 12 and from the remote device to the central hub, a bidirectional optical system may be utilized with one wavelength of light going downstream (from central hub 10 to remote device 12) and a different wavelength of light going upstream (from remote device 12 to central hub 10), thereby reducing the fiber count in the cable from two to one (replace two optical fibers 27 in FIG. 2 with one optical fiber). The cable 14 may also include additional optical fibers.

The central hub 10 maintains a source of low-temperature coolant that is sent through distribution plumbing (such as a manifold), through the interface module 13a, connector 29a, and down cable's 14 coolant supply line 28a to the remote device 12. The connector 29b at the other end of the cable 14 is coupled to the interface module 13b and the supply coolant is routed through elements inside the device 12 such as heat sinks 25 and heat exchangers that remove heat. The warmed coolant may be aggregated through a return manifold and returned to the central hub 10 out the device's interface module 13b, connector 29b, and through the return tube 28b in the cable 14. The cable 14 returns the coolant to the central hub 10, via connector 29a and interface module 13a where the return coolant passes through the heat exchanger 22 to remove the heat from the cooling loop to an external cooling plant, and the cycle repeats.

The heat exchanger 22 may be a liquid-liquid heat exchanger, with the heat transferred to chilled water or a cooling tower circuit, for example. The heat exchanger 22 may also be a liquid-air heat exchanger, with fans provided to expel the waste heat to the atmosphere. The hot coolant returning from the cable 14 may be monitored by sensor 17a for temperature, pressure, and flow. Once the coolant has released its heat, it may pass back through a pump 19 and sensor 17a, and then sent back out to the cooling loop. One or more variable-speed pumps 19 may be provided at the central hub 10 or remote device 12 to circulate the fluid around the cooling loop. The coolant may comprise, for example, water, antifreeze, liquid or gaseous refrigerants, or mixed-phase coolants (partially changing from liquid to gas along the loop).

In an alternate embodiment, only a single coolant tube is provided within the cable 14 and high pressure air (e.g., supplied by a central compressor with an intercooler) is used as the coolant. When the air enters the remote device 12, it is allowed to expand and/or impinge directly on heat dissipating elements inside the device. Cooling may be accomplished by forced convection via mass flow of the air and additional temperature reduction may be provided via a Joule-Thomson effect as the high pressure air expands to atmospheric pressure. Once the air has completed its cooling tasks, it can be exhausted to the atmosphere outside the remote device 12 via a series of check valves and mufflers (not shown).

In cold environments the coolant may be supplied above ambient temperature to warm the remote device 12. This can be valuable where remote devices 12 are located in cold climates or in cold parts of industrial plants, and the devices have cold-sensitive components such as optics or disk drives. This may be more energy efficient than providing electric heaters at each device, as is used in conventional systems.

The cooling loops from all of the remote devices 12 may be isolated from one another or be intermixed through a manifold and a large central heat exchanger for overall system thermal efficiency. The central hub 10 may also include one or more support systems to filter the coolant, supply fresh coolant, adjust anti-corrosion chemicals, bleed air from the loops, or fill and drain loops as needed for installation and maintenance of the cables 14 and remote devices 12.

The interface modules 13a, 13b are configured to interface with the cable connectors 29a, 29b at the central hub 10 and remote device 12 for transmitting and receiving power, data, and cooling. In one embodiment, the connectors 29a, 29b carry power, fiber, and coolant in the same connector body. The connectors 29a, 29b are preferably configured to mate and de-mate (couple, uncouple) easily by hand or robotic manipulator. In order to prevent coolant leakage when the cable 14 is uncoupled from the central hub 10 or remote device 12, the connectors 29a, 29b and interface modules 13a, 13b preferably include valves (e.g., quick disconnects) (not shown) that automatically shut off flow into and out of the cable, and into and out of the network device. In one or more embodiments, the interface module 13a, 13b may be configured to allow connection sequencing and feedback to occur. For example, electrical connections may not be made until a verified sealed coolant loop is established. The cable connectors 29a, 29b may also include visual or tactile evidence of whether a line is pressurized, thereby reducing the possibility of user installation or maintenance errors.

In one or more embodiments, a distributed control system comprising components located on the central hub's controller and on the remote device's processor may communicate over the fiber links 27 in the combined cable 14. One or more components of the control system may be located within the interface module 13a, 13b. For example, one or more sensors 17a, 17b, or valves 17c may be located within the interface module 13a, 13b, as described below with respect to FIG. 6. Additional sensors may also be located within the network device (e.g., within cooling loop at critical locations within the network device). Control systems for all three utilities may interact between the remote devices 12 and the central hub 10 to ensure that each remote device receives a correct amount of power, data, and cooling. For example, servo valves 17c or variable speed pump 19 may be used to insure the rate of coolant flow matches requirements of the remote thermal load. Temperature, pressure, and flow sensors 17a may be used to measure coolant characteristics at multiple stages of the cooling loop (e.g., at the inlet of the central hub 10 and inlet of the remote device 12) and a subset of these sensors may also be strategically placed at outlets and intermediate points. The remote device 12 may include, for example, temperature sensors to monitor die temperatures of critical semiconductors, temperatures of critical components (e.g., optical modules, disk drives), or the air temperature inside a device's sealed enclosure. The control system may monitor the remote device's internal temperatures and adjust the coolant flow to maintain a set point temperature. This feedback system insures the correct coolant flow is always present. Too much coolant flow will waste energy, while too little coolant flow will cause critical components in the remote device 12 to overheat.

Monitoring information from power sensors 17b (e.g., current, voltage) or data usage (e.g., bandwidth, buffer/queue size) may also be used by the control system in managing cooling at the remote device 12. The control system may also use the monitoring information to allocate power and data.

As described in detail below with respect to FIG. 4, the interface module 13a, 13b may employ a dual-power mode that detects and negotiates between the power source 10 and powered device 12. This negotiation distinguishes between and accommodates different power-delivery schemes, such as standard PoE, high power PoE, pulsed power, or other power modes capable of power delivery through the optical transceiver module 13a, 13b. For example, standard PoE distribution may be used for remote network devices 12 rated less than about 100 W. For higher power remote-powered devices 12, pulsed power or other higher voltage techniques may be used to create an efficient energy distribution network.

Machine learning may also be used within the control system to compensate for the potentially long response times between when coolant flow rates change and the remote device's temperatures react to the change. The output of a control algorithm may be used to adjust the pumps 19 to move the correct volume of coolant to the device 12, and may also be used to adjust valves 17c within the remote device to direct different portions of the coolant to different internal heat sinks to properly balance the use of coolant among a plurality of thermal loads.

The control system may also include one or more safety features. For example, the control system may instantly stop the coolant flow and begin a purge cycle if the coolant flow leaving the central hub 10 does not closely match the flow received at the remote devices 12, which may indicate a leak in the system. The control system may also shut down a remote device if an internal temperature exceeds a predetermined high limit or open relief valves if pressure limits in the coolant loop are exceeded. The system may also predictively detect problems in the cooling system such as a pressure rise caused by a kink in the cable 14, reduction in thermal transfer caused by corrosion of heat sinks 25, or impending bearing failures in the pump 19, before they become serious. The cable's jacket may also include two small sense conductors for use in identifying a leak in the cooling system. If a coolant tube develops a leak, the coolant within the jacket causes a signal to be passed between these conductors, and a device such as a TDR (Time-Domain Reflectometer) at the central hub 10 may be used to locate the exact position of the cable fault, thereby facilitating repair.

All three utilities (power, data, cooling) provided by the combined cable 14 may interact with the control system to keep the system safe and efficient. For example, sensor 17b located in the power supply 23 of the remote device 12 may be used to notify the central hub 10 when it is safe to increase power on the wires to the remote device without damaging the system or endangering an operator.

In one or more embodiments, the interface module 13b at the remote network device 12 may use a small amount of power at startup to communicate its power, data, and cooling requirements. The powered device 12 may then configure itself accordingly for full power operation. In one example, power type, safety operation of the module, data rates, and cooling capabilities are negotiated between the central hub 10 and network device 12 through data communications signals on optical fiber 27. The interface module 13b communicates back to the powered device 12 any operational fault, including the loss of data. Such fault may result in power immediately being turned off. Full power supply may not be reestablished until the powered device is able to communicate back in low power mode that higher power may be safely applied.

Initial system modeling and characterization may be used to provide expected power, flow properties, and thermal performance operating envelopes, which may provide an initial configuration for new devices and a reference for setting system warning and shut-down limits. This initial characteristic envelope may be improved and fine-tuned over time heuristically through machine learning and other techniques. If the system detects additional power flow in power conductors 26 (e.g., due to a sudden load increase in CPU (Central Processing Unit) in remote device 12), the control system may proactively increase coolant flow in anticipation of an impending increase in heat sink 25 temperature, even before the temperature sensors 17a register it. This interlock between the various sensors and control systems helps to improve the overall responsivity and stability of the complete system.

In one or more embodiments, the central hub 10 may utilize control algorithms that know what proportion of bandwidth and power are being used by each of the remote devices 12, and use this data to predict its energy and cooling needs. This may be used to ensure that the cooling and power capabilities remain in balance for each of the remote device's needs, and also are fairly allocated across the network. As previously noted, machine learning techniques may be employed to automatically establish system characteristic response times, thereby improving power and cooling control loops heuristically over time.

In one or more embodiments, the central hub 10 may periodically (e.g., at least tens of times per second or any other suitable interval) receive multiple sensor readings associated with all of the remote devices 12. These readings may include, for example, current and voltage measurements at both the hub 10 and remote devices 12 for the power, transmit and receive queue sizes at both central hub 10 and remote device 12 for the data channel, and temperature, pressure, and flow readings at both ends of the coolant distribution tubes 28a, 28b. The controller may perform detailed control loop calculations to determine set-points (settings) for the various control actuators (pumps, valves, power control device (timeslot allocation), bandwidth controller (bandwidth allocation)) in the system. These calculations may be assisted through the use of artificial intelligence or machine learning techniques, as previously described. The calculations preferably take into account the many interactions between data, power, and cooling for each of the remote devices, and also the complex interactions and potential instabilities between devices sharing a loop or between multiple devices and loops sharing central hub 10. The results of the calculations may be used to actuate control devices in the distribution system operable to recalculate an interleave pattern for power packets, recalculate a passive optical network timeslot allocation, or modify the coolant pump 19 and valve 17c setting for one or more of the remote devices 12. The data channel 27 may be used to provide closed-loop communication paths between the sensors, central control algorithms, and actuators.

As previously noted, the cable 14 may comprise various configurations of power conductors, optical fiber, and coolant tubes. These components, along with one or more additional components that may be used to isolate selected elements from each other, manage thermal conductivity between the elements, provide thermal paths, or provide protection and strength, are contained within an outer jacket of the cable. The coolant tubes may have various cross-sectional shapes and arrangements, which may yield more space and thermally efficient cables. Supply and return tube wall material thermal conductivity may be adjusted to optimize overall system cooling.

The cable 14 may also be configured to prevent heat loss through supply-return tube-tube conduction, external environment conduction, coolant tube-power conduction, or any combination of these or other conditions. For example, a thermal isolation material may be located between coolant tubes to prevent heat loss. The thermal isolation material may also be placed between the coolant tubes and the outer jacket. In another embodiment, one or both coolant tubes may be provided with a low thermal impedance path to the outside. Thermal paths may also be provided between the power conductors and one of the coolant tubes to use some of the cooling power of the loop to keep the power conductors in the cables cool.

In one or more embodiments, in order to reduce fluid frictional effects, tube interiors may be treated with hydrophobic coatings and the coolant may include surfactants. Also, the supply and return coolant tubes 28a, 28b may be composed of materials having different conductive properties so that the complete cable assembly may be thermally tuned to enhance system performance. It is to be understood that the configuration, arrangement, and number of power wires 26, optical fibers 27, coolant tubes 28a, 28b, and insulation regions, conduction regions, sense conductors, shields, coatings, or layers described herein are only examples and that other configurations or arrangements may be used without departing from the scope of the embodiments.

Figure 3:
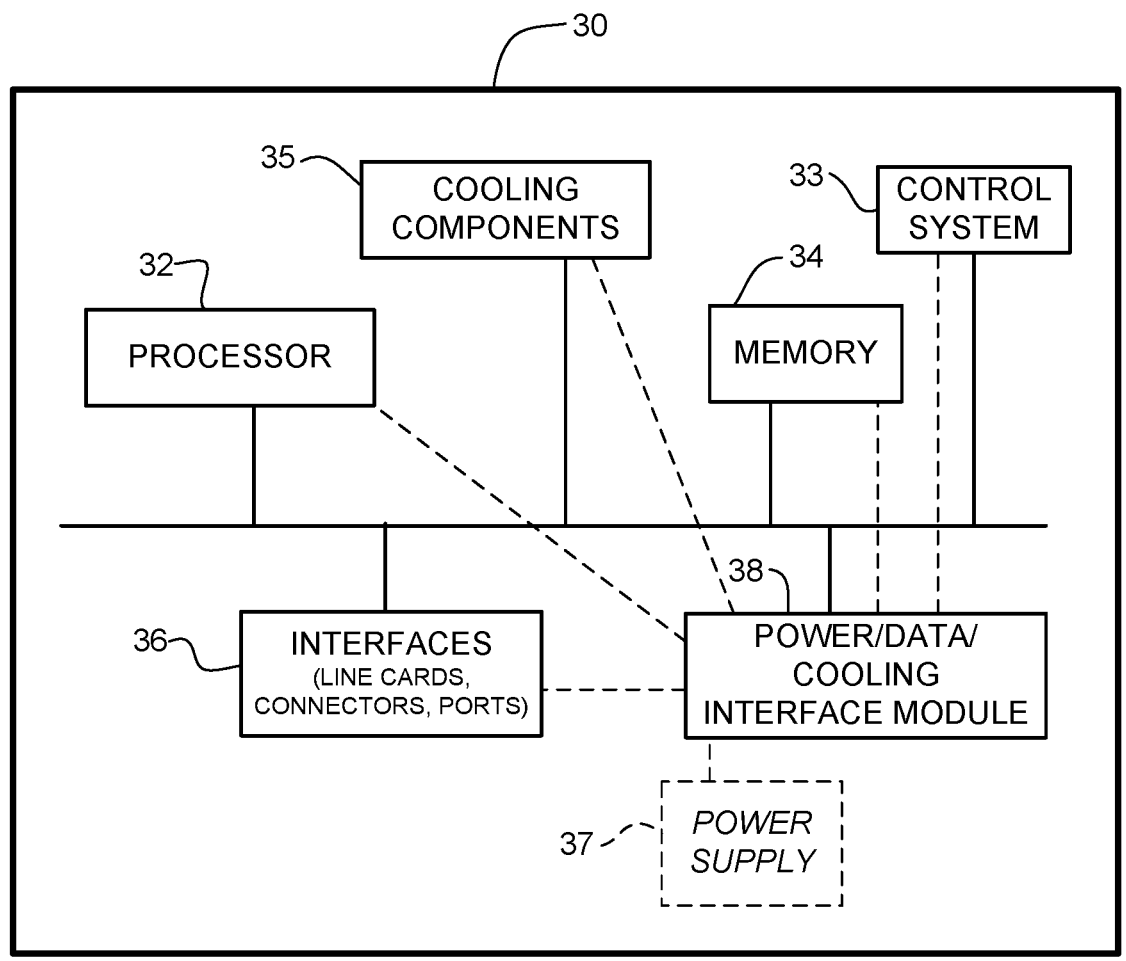
FIG. 3 depicts an example of a network device useful in implementing embodiments described herein.

FIG. 3 illustrates an example of a network device 30 (e.g., central hub 10, remote devices 12 in FIG. 1) that may be used to implement the embodiments described herein. In one embodiment, the network device 30 is a programmable machine that may be implemented in hardware, software, or any combination thereof. The network device 30 includes one or more processors 32, control system 33, memory 34, cooling components (pumps, valves, sensors) 35, interfaces (electrical, optical, fluid) 36, and interface module 38.

The network device 30 may include any number of processors 32 (e.g., single or multi-processor computing device or system), which may communicate with a forwarding engine or packet forwarder operable to process a packet or packet header. The processor 32 may receive instructions from a software application or module, which causes the processor to perform functions of one or more embodiments described herein. The processor 32 may also operate one or more components of the control system 33. The control system (controller) 33 may comprise components (modules, code, software, logic) located at the central hub 10 and the remote device 12, and interconnected through the combined cable 14 (FIGS. 1 and 3). The cooling components 35 may include any number of sensors (e.g., thermal, pressure, flow), valves, or pumps within the cooling loop that provide input (monitoring information) to the control system 33 or receive instructions from the control system. The control system 33 may also receive input from power sensors or data monitoring devices.

Memory 34 may be a volatile memory or non-volatile storage, which stores various applications, operating systems, modules, and data for execution and use by the processor 32. For example, components of the interface module 38, control logic for cooling components 35, or other parts of the control system 33 (e.g., code, logic, or firmware, etc.) may be stored in the memory 34. The network device 30 may include any number of memory components.

Logic may be encoded in one or more tangible media for execution by the processor 32. For example, the processor 32 may execute code stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform functions such as power level negotiations, safety subsystems, or thermal control, as described herein. The network device 30 may include any number of processors 32.

The interfaces 36 may comprise any number of interfaces (e.g., power, data, and fluid connectors, line cards, ports, combined power, data, and cooling connectors) for receiving power, data, and cooling, or transmitting power, data, and cooling to other devices. A network interface may be configured to transmit or receive data using a variety of different communications protocols and may include mechanical, electrical, and signaling circuitry for communicating data over physical links coupled to the network. One or more of the interfaces 36 may be configured for PoE+F+C, PoE+F, PoE, PoF (Power over Fiber), or similar operation. As described below, one or more interfaces 36 may be incorporated into the interface module 38 or communicate therewith.

The PoE+F+C interface module 38 may comprise hardware or software for use in power detection, power monitor and control, or power enable/disable, as described below. The interface module 38 may further comprise one or more of the processor or memory components, or interfaces. For example, the interface module 38 may comprise an electrical interface for delivering power from the PSE or receiving power at the PD, an optical interface for receiving or transmitting optical communications signals comprising data and control signals, and a fluid interface for receiving and delivering coolant.

In one or more embodiments, the interface module 38 comprises a PoE+F+C optical module (e.g., optical transceiver module configured for receiving (or delivering) power from power supply 37, data to or from network interface 26, and receiving (or delivering) cooling at cooling components 35), as previously described. Details of an interface module 38 in accordance with one embodiment are described below with respect to FIG. 6.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
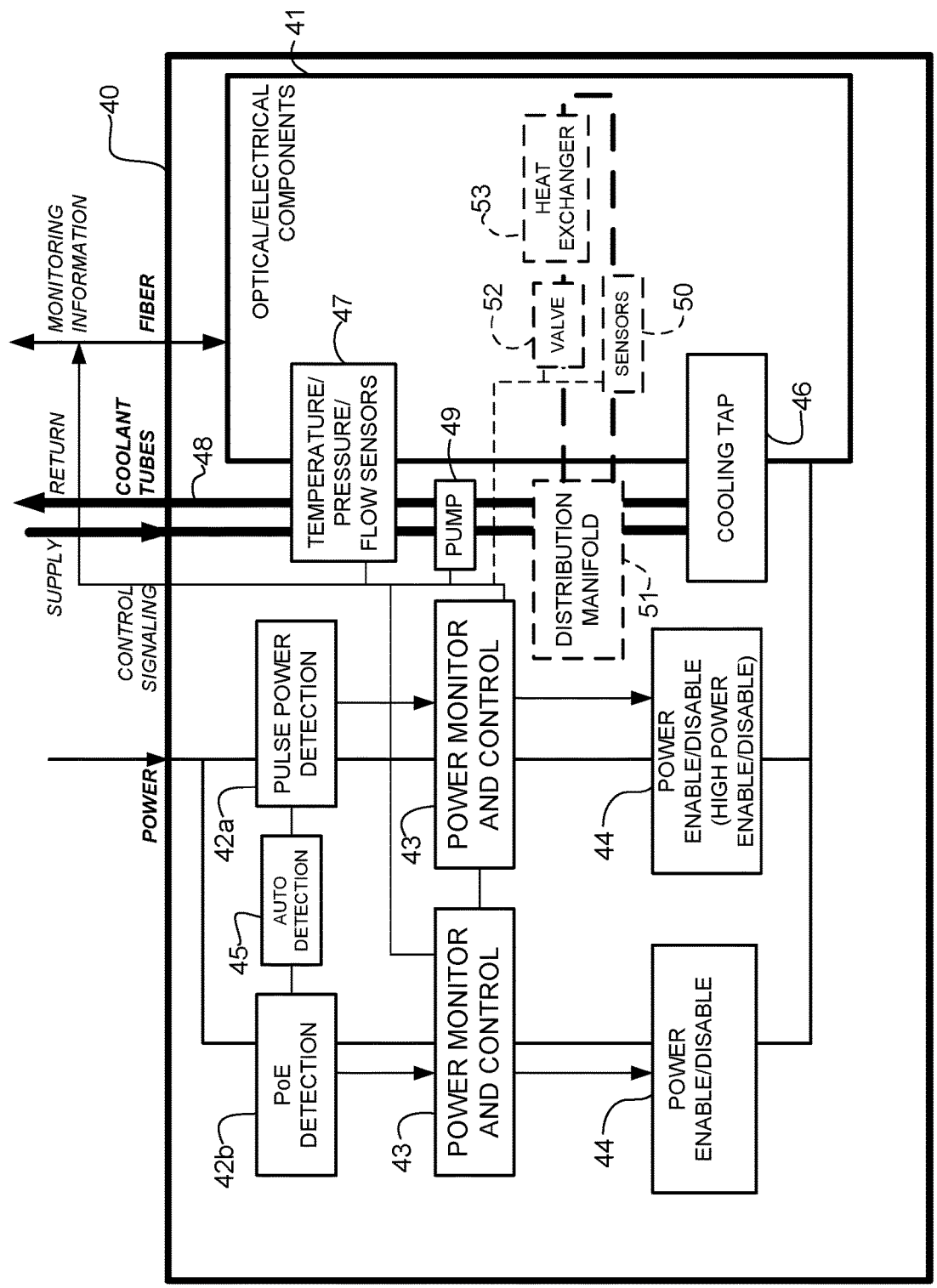
FIG. 4 is a block diagram illustrating power and cooling monitoring and control at the remote device, in accordance with one embodiment.

FIG. 4 illustrates power and cooling control and monitoring at a network device 40, in accordance with one embodiment. As previously noted, one or more of the monitor or control components may be located at the PoE+F+C interface module or in communication with one or more components of the interface module. Although the power, data, and cooling lines are shown separately entering or leaving the network device in FIG. 4, it is to be understood that the power, data, and cooling are delivered together at the network device as shown in FIG. 1 and described above.

The network device 40 includes optical/electrical components 41 and power components including, power detection modules 42a, 42b, power monitor and control modules 43, and power enable/disable modules 44. Although PoE and pulse power are described in conjunction with detection elements 42a, 42b, it should be understood that other power delivery schemes including AC, DC, and USB may be supported with similar elements. The power components may be isolated from the optical components 41 via an isolation component (e.g., isolation material or element), which electromagnetically isolates the power circuit from the optical components to prevent interference with operation of the optics. In the example shown in FIG. 4, the network device 40 includes an auto detection module 45 that operates with a pulse power detection module 42a and PoE detection module 42b. In this example, each module 42a, 42b is in communication with its own power monitor and control module 43 and power enable/disable module 44. The circuit detects the type of power applied to the network device 40, determines if PoE or pulsed power is a more efficient power delivery method, and then uses the selected power delivery mode. Additional modes may support other power+data standards (e.g., USB (Universal Serial Bus)).

The power monitor and control modules 43 continuously monitor power delivery to ensure that the system can support the needed power delivery, and no safety limits (voltage, current) are exceeded. The power monitor and control modules 43 may also monitor optical signaling and disable power if there is a lack of optical transitions or communication with the power source. Temperature, pressure, or flow sensors 47, 50 may also provide input to the power monitor and control modules 43 so that power may be disabled if the temperature at the network device 40 exceeds a specified limit. Power monitor and control function may sense the voltage and current flow, and report these readings to the central control function. As previously described, the network device 40 may use a small amount of power at startup to communicate its power, data, and cooling requirements. The network device 40 may then be configured for full power operation (e.g., at high power enable/disable module 44). If a fault is detected, full power supply may not be established until the network device communicates in low power mode that high power can be safely applied.

Cooling is supplied to the network device 40 via cooling (coolant) tubes in a cooling (coolant) loop 48, which provides cooling to the powered equipment through a cooling tap (heat sink, heat exchanger) 46, 53 and returns warm (hot) coolant to the central hub. The network device 40 may also include a number of components for use in managing the cooling. The cooling loop 48 within the network device 40 may include any number of sensors 47, 50 for monitoring aggregate and individual branch temperature, pressure, and flow rate at strategic points around the loop (e.g., entering and leaving the device, at critical component locations). The sensor 47 may be used, for example, to check that the remote device 40 receives approximately the same amount of coolant as supplied by the central hub to help detect leaks or blockage in the cable, and confirm that the temperature and pressure are within specified limits.

Distribution plumbing routes the coolant in the cooling loop 48 to various thermal control elements within the network device 40 to actively regulate cooling through the individual flow paths. For example, a distribution manifold 51 may be included in the network device 40 to route the coolant to the cooling tap 46 and heat exchanger 53. If the manifold 51 has multiple outputs, each may be equipped with a valve 52 (manual or servo controlled) to regulate the individual flow paths. For simplification, FIG. 4 shows only one valve 52 in the cooling path with heat exchanger 53, however, a valve may also be included in the loop with cooling tap 46. Thermal control elements may include liquid cooled heatsinks, heat pipes, or other devices directly attached to the hottest components (CPUs (Central Processing Units), GPUs (Graphic Processing Units), power supplies, optical components, etc.) to directly remove their heat. The network device 40 may also include channels in cold plates or in walls of the device's enclosure to cool anything they contact. Air to liquid heat exchangers, which may be augmented by a small internal fan, may be provided to cool the air inside a sealed box. Once the coolant passes through these elements and removes the device's heat, it may pass through additional temperature, pressure, or flow sensors, through another manifold, and out to the coolant return tube. In the example shown in FIG. 4, the cooling system includes a pump 49 operable to help drive the coolant around the cooling loop 48 or back to the central hub.

The distribution manifold 51 may comprise any number of individual manifolds (e.g., supply and return manifolds) to provide any number of cooling branches directed to one or more components within the network device 40. Also, the cooling loop 48 may include any number of pumps 49 or valves 52 to control flow in each branch of the cooling loop. This flow may be set by an active feedback loop that senses the temperature of a critical thermal load (e.g., die temperature of a high power semiconductor), and continuously adjusts the flow in the loop that serves the heat sink or heat exchanger 53. The pump 49 and valve 52 may be controlled by the control system and operate based on control logic received from the central hub in response to monitoring at the network device 40.

One or more of the components shown in FIG. 4 may be located within the interface module 13 (FIG. 1). For example, power detection modules 42a, 42b, power monitor and control modules 43, and power enable/disable modules 44 may be located within the interface module 13. Also, as described below, cooling components such as sensors, valves or heat sinks may be located within the interface module. The cooling loop 48 may be used, for example, to cool optical or power components within the interface module or other components within the network device.

It is to be understood that the network device 40 shown in FIG. 4 is only an example and that the network device may include different components or arrangement of components, without departing from the scope of the embodiments. For example, the cooling system may include any number of pumps, manifolds, valves, heat sinks, heat exchangers, or sensors located in various locations within the coolant loop or arranged to cool various elements or portions of the device. Also, the network device 40 may include any number of power sensors or control modules operable to communicate with the control system at the central hub to optimize power delivery and cooling at the network device.

Figure 5:
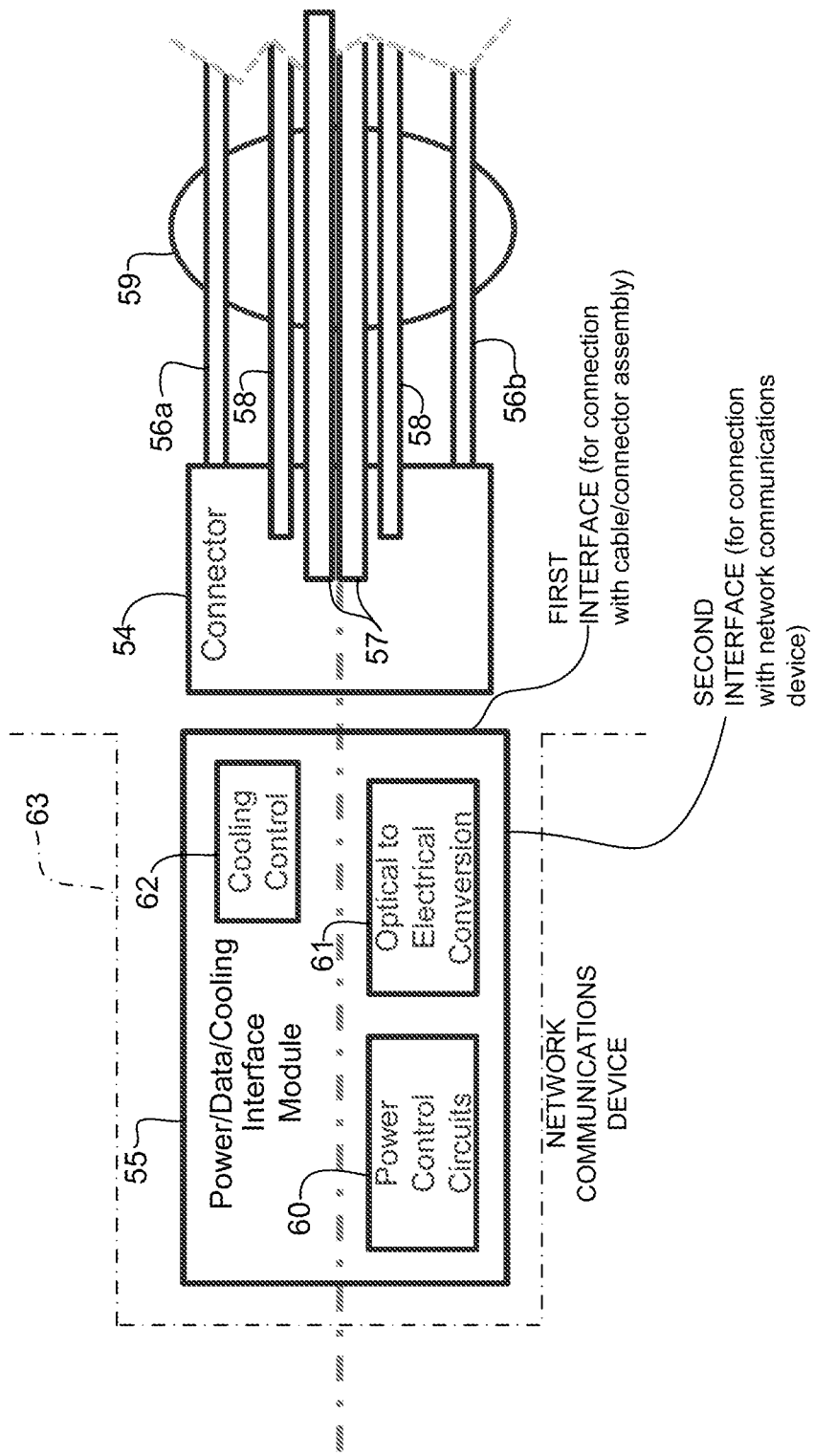
FIG. 5 is a diagram of a cable connector and interface module, in accordance with one embodiment.

FIG. 5 illustrates an example of a connector cable assembly comprising combined power, fiber, and cooling, in accordance with one embodiment. A connector (e.g., modified MPO (Multi-fiber Push On) connector) 54 is attached to cable 59 and provides power, data, and cooling to interface module 55 at a first interface. The example shown in FIG. 5 includes two cooling lines (pipes, tubes) 56a, 56b (supply and return), optical fibers 57, and power lines 58, which may include any number of chassis grounds, signal grounds, or pins/mates. Press crimp interconnectors may be used to terminate power, ground, and shield, for example. The connector cable assembly shown in FIG. 5 may comprise any number or combination of power lines, optical fibers, and cooling lines. The interface module 55 is configured to mate with the connector 54 and comprises power control circuits 60, optical to electrical (and electrical to optical) conversion module 61, and cooling control 62. The interface module 55 connects to a network device (partially shown in phantom at 63) at a second interface.

In one embodiment, the interface module 55 includes an optical transceiver (optical module, optical device, optics module, transceiver, silicon photonics optical transceiver) configured to source or receive power and data, as described in U.S. patent application Ser. No. 15/707,976 ("Power Delivery Through an Optical System", filed Sep. 18, 2017), incorporated herein by reference in its entirety. As described below, the optical transceiver module is further modified to deliver and receive cooling. The transceiver modules operate as an engine that bidirectionally converts optical signals to electrical signals or in general as an interface to the network element copper wire or optical fiber. In one or more embodiments, the optical transceiver may be a pluggable transceiver module in any form factor (e.g., SFP (Small Form-Factor Pluggable), QSFP (Quad Small Form-Factor Pluggable), CFP (C Form-Factor Pluggable), and the like), and may support data rates up to 400 Gbps, for example. Hosts for these pluggable optical modules include line cards 16 on the central hub 10 or network devices 12 (FIG. 1). For example, one or more line cards in the network devices may host optical modules 55. The host may include a printed circuit board (PCB) and electronic components and circuits operable to interface telecommunications lines in a telecommunications network. The host may be configured to perform one or more operations and receive any number or type of pluggable transceiver modules configured for transmitting and receiving signals.

The interface module (optical transceiver) 55 may also be configured for operation with AOC (Active Optical Cable) and form factors used in UWB (Ultra-Wideband) applications, including for example, Ultra HDMI (High-Definition Multimedia Interface), serial high bandwidth cables (e.g., thunderbolt), and other form factors. Also, the optical module 55 may be configured for operation in point-to-multipoint or multipoint-to-point topology. For example, QFSP may breakout to SFP+. One or more embodiments may be configured to allow for load shifting. In one or more embodiments, the interface module 55 comprises a silicon photonics optical transceiver modified to source power or receive power, and deliver or receive cooling.

Figure 6:
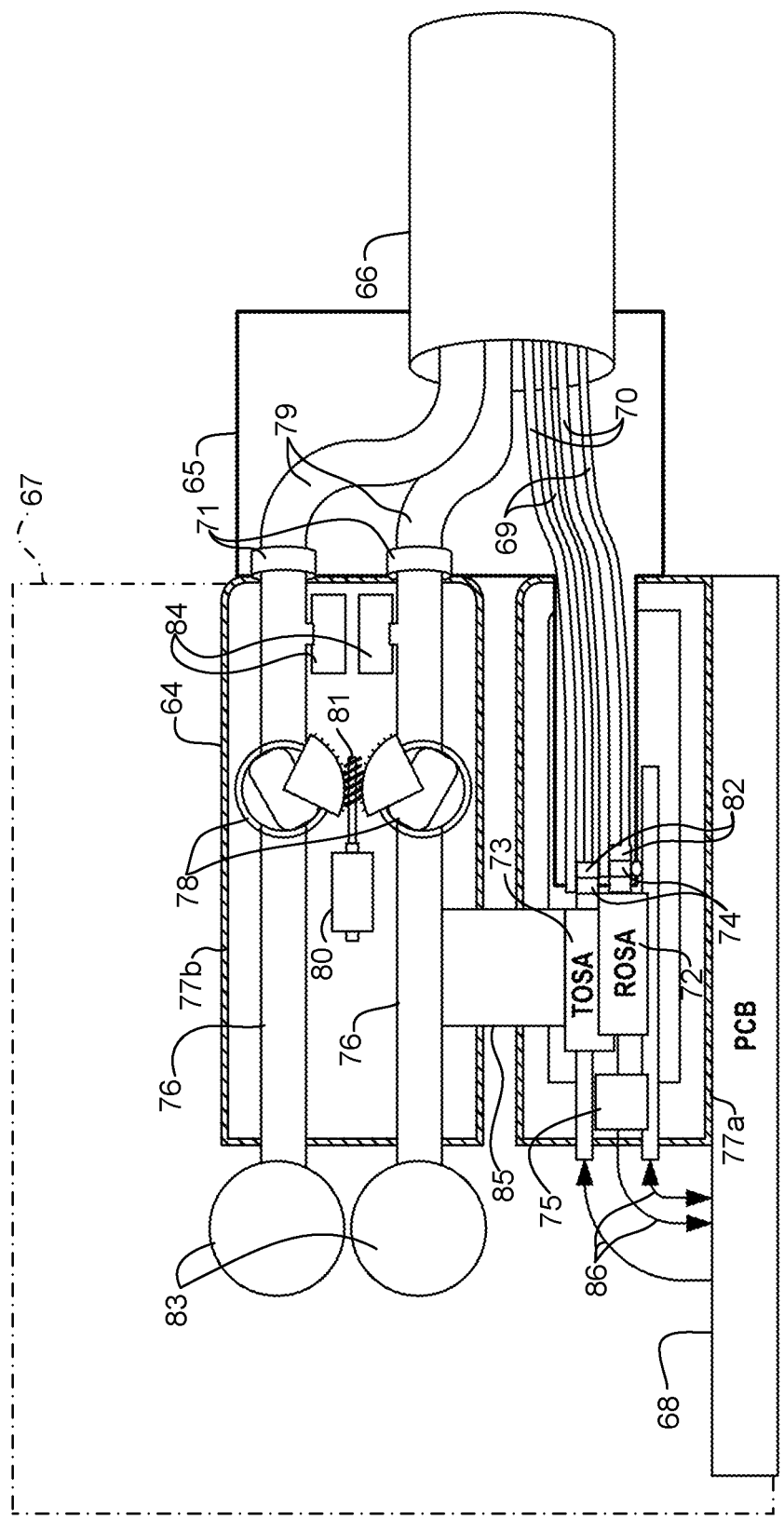
FIG. 6 is a schematic of the interface module of FIG. 5, in accordance with one embodiment.

Referring now to FIG. 6, an interface module 64, in accordance with one embodiment, is shown coupled to a connecter 65 located at one end of a cable 66 comprising optical fibers 69 for carrying data, electrical wires (e.g., copper wires) 70 for high power energy distribution, and cooling pipes (tubes) 79 for carrying coolant between the network devices. Data may also be carried on the same copper used to carry the power. The interface module 64 is inserted into a receptacle in a network device (shown in phantom at 67) that provisions power, data, and cooling provided by the central hub 10 and used by the remote network devices 12 (FIGS. 1 and 2).

The interface module 64 comprises a first interface for coupling with the cable connector 65 and a second interface for coupling with the network device 67 through PCB (printed circuit board) 68, which may be located on a line card at the network device. In the example shown in FIG. 6, the first interface comprises coolant tube connectors 71 for connection to coolant tubes (or passages) 79 in the connector 65, optical interfaces 82 for receiving the optical fibers 69, and power contacts 74 for transferring power between the power wires 70 and the interface module 64. The second interface is configured for connection to the PCB 68 (e.g., through electrical data paths 86) and interfaces with electronic components and circuits on the PCB. The second interface comprises the data and power interfaces 86 and a cooling interface for connection to cooling manifolds 83.

As previously noted, the interface module 64 may comprise a modified version of an optical transceiver module and optical module cage (e.g., modified SFP+optical transceiver). In one or more embodiments, the interface module 64 is configured to fit within a standard optical module cage and footprint. In one embodiment, a first portion 77a of a housing (optical/power module) of the interface module 64 may generally correspond to a standard optical module cage and a second portion 77b of the housing (cooling module) has a similar form factor to the optical module cage, and may be situated immediately above or adjacent to the first portion of the housing on the circuit board 68.

The cooling is preferably maintained in a separate portion of the housing from the power and data. For example, as shown in FIG. 6, the first portion 77a of the housing contains power and data components while the second portion 77b of the housing (upper portion of interface module 64 as viewed in FIG. 6) contains the cooling flow (coolant loop). The first portion 77a of the housing contains optical transceiver components such as the ROSA (Receive Optical Sub Assembly) 72 and TOSA (Transmit Optical Sub Assembly) 73, power contacts 74, and optical/power sensors (e.g., current/voltage sensors) and control module (both indicated at block 75).

The power contacts (e.g., pulse power contacts) 74 are provided to integrate high power energy distribution with the fiber optical signals. For example, heavy power conductors 70 may terminate on the optical ferrule contacts 82, which in turn deliver energy from the PCB through the cage, and onto the module for the central hub 10 (FIGS. 1 and 6). In the preferred embodiment power contacts 74 are designed to fit within the mechanical and optical design of a standard optical module connector. At the central hub, the power conductors 70 pass through the combined connector body 65 and out the combined cable 66 with the fibers 69, distributing both data and power, along with cooling to the remote network device. A set of current and voltage sensors 75 may be integrated in the interface module 64 to monitor the electrical behavior of the high power energy distribution circuit and may instantly cut off the energy flow if problems such as a short or power-surge are detected. Also, as previously described, the sensors and control module 75 may be used to enable high power operation at the interface module only when it is determined that it is safe to receive high power at the powered device.

In one or more embodiments, contact points 74 for power within the interface module 64 may be configured as described in U.S. patent application Ser. No. 15/707,976, referenced above. For example, the contact points 74 may comprise metalized barrels around optical ferrules 82 of standard optical connectors (e.g., LC type). Contacts associated with the interface module 64 may connect these barrels to the optical module cage, which in turn connects to the circuit board 68. Heavy copper wires 70 within the combined cable 66 may be field terminated to the other end of the connector interface using similar operations to terminating the fibers, for example.

Two large manifolds 83 may be used at the central hub to supply chilled coolant to the plurality of interface modules 64 and return warmed coolant from the interface modules. The coolant supply and return channels 76 are tapped into the manifolds 83 for each of the interface modules. In one embodiment, the coolant flows through a pair of motorized ball valves 78 (or other suitable valves) to precisely control the flow in each combined cable 66 (or to the network device 67). In this example, the ball valves 78 are activated by a motor 80 and quadrant worm gear 81 that is operable to adjust a position of the valve from fully open (e.g., zero degree (horizontal as viewed in FIG. 6) valve position) to fully closed (e.g., ninety degree (vertical) valve position). Both valves 78 may be actuated by a single motor, as shown in FIG. 6, or two separate motors may be provided for individual control of coolant supply and return flows through tubes 76. The fluid connections may flow past sensors 84 configured to monitor key parameters (e.g., temperature, pressure, mass flow rate, or any combination) in both the coolant supply and coolant return pipes 76. The coolant flow passes through leak-proof fluid disconnects 71 (e.g., Luer-Lock type connectors), through connector 65 and into the combined cable 66 to the remote network device. The fluid interface connectors 71 may comprise, for example, quick disconnects comprising a coupling assembly with two halves, each containing a valve held open when the coupling is connected to allow fluid to flow therethrough. When the cable and connector assembly is disconnected (or the interface module is removed from the network device), a spring in each half closes the valve, thus preventing loss of fluid and entry of air.

As shown in FIG. 6, the high capacity coolant loop is in close proximity to temperature sensitive optical components in the optical module 64 and a thermally conductive optical component cooling path 85 may be established to the ROSA 72 and TOSA 73 (or any other high power or temperature sensitive components in the optical module) to allow the use of faster, higher power, higher density optical components. Cooling may be integrated within the optical transceiver cage to allow for advanced cooling of any of the internal components of the optical module 64.

The interface module 64 at the remote network device may also be configured to access cooling pipes 76 delivering cooling to various parts of the powered device 67, including using cooling inside the module for specific TOSA, ROSA, laser, or other component cooling requirements, as well as the ability to apply cooling to the module cage assembly for full module cooling as needed. Similar to the host module, cooling may be integrated within the optical module cage (housing) to allow for advanced cooling of the internal components of the optical module.

Although the method and apparatus have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. An apparatus comprising:
    an interface module operable in a network device for coupling a cable delivering combined power, data, and cooling to the network device, the interface module comprising:
        an electrical interface for receiving power for powering the network device;
        an optical transceiver for receiving an optical communications signal and converting the optical communications signal to an electrical signal;
        a fluid interface for receiving coolant; and
        sensors for monitoring said power and cooling at the interface module and providing information to a central network device delivering said combined power, data, and cooling.

2. The apparatus of claim 1 wherein the interface module further comprises a cooling path for cooling optical components in the interface module.

3. The apparatus of claim 1 wherein said information further comprises power, data, and cooling needs of the network device.

4. The apparatus of claim 1 wherein said information comprises indication of an operational fault in a combined power, data, and cooling system comprising the network device, cable, and interface module.

5. The apparatus of claim 1 wherein the interface module further comprises a valve for controlling said cooling.

6. The apparatus of claim 1 wherein the interface module is configured for connection to the network device at an optical module cage.

7. The apparatus of claim 1 wherein the optical transceiver further comprises a receive optical subassembly and a transmit optical subassembly.

8. The apparatus of claim 1 wherein the interface module further comprises a power disable module for disabling the power based on a status of said power, said optical communications signals, or said cooling.

9. The apparatus of claim 1 wherein the interface module is configured to detect a type of power received at the interface module and select a delivery mode of said power to the network device based on the detected type of power.

10. An apparatus comprising:
an interface module operable at power sourcing equipment for coupling a cable delivering combined power, data, and cooling from the power sourcing equipment, the interface module comprising:
an electrical interface for delivering power for powering a remote network device;
an optical interface for delivering optical communications signals to the remote network device; and
a fluid interface for delivering coolant to the remote network device; and
a control system for receiving power and cooling information from the remote network device and controlling delivery of said power and cooling from the power sourcing equipment to the remote network device.

11. The apparatus of claim 10 wherein the power sourcing equipment comprises a pump for controlling delivery of said cooling based on said power and cooling information received from the remote network device.

12. The apparatus of claim 10 wherein the control system is configured to transmit a control signal over the optical interface to enable or disable power at the remote network device based on said power and cooling information from the remote network device.

13. The apparatus of claim 10 wherein the interface module is configured for connection to the power sourcing equipment at an optical transceiver interface.

14. The apparatus of claim 10 wherein the interface module comprises power contacts for integration of high power energy distribution with said optical communications signals.

15. The apparatus of claim 10 wherein the interface module comprises a valve to control delivery of said cooling to the remote network device.

16. An interface module comprising:
a first interface for coupling with a cable connector of a cable comprising an electrical wire for carrying power, an optical fiber for carrying data, and a cooling tube for carrying coolant;
a second interface for coupling with a network device;
power contacts for transferring power between the cable and the network device at said first interface;
an optical transceiver;
a cooling path for cooling components in the interface module; and
sensors for monitoring power and cooling at the interface module, wherein monitoring information is provided to a control system for controlling power, data, and cooling at the interface module when coupled to the cable and the network device.

17. The interface module of claim 16 wherein the interface module comprises an optical transceiver module modified for delivering or receiving power and cooling.

18. The interface module of claim 16 further comprising a power enable module for enabling high power operation after a safety check is performed at the interface module.

19. The interface module of claim 16 wherein the interface module is configured to detect a type of power received at the interface module and select a delivery mode of the power to the network device based on the detected type of power.

20. The interface module of claim 16 wherein said first interface comprises a fluid connector, an optical interface, and a power contact and said second interface is configured for connection to a printed circuit board on a line card of the network device.

* * * * *